United States Patent [19]

Cavello et al.

[11] Patent Number: 5,568,359
[45] Date of Patent: Oct. 22, 1996

[54] PORTABLE COMPUTER DESKTOP DOCKING SYSTEM

[75] Inventors: Christopher Cavello; Steven Gluskoter; Damon Broder, all of Austin, Tex.

[73] Assignee: Dell USA, L.P., Austin, Tex.

[21] Appl. No.: 453,131

[22] Filed: May 24, 1995

[51] Int. Cl.$^6$ ............................... G06F 1/16; H05K 7/10
[52] U.S. Cl. ............................. 361/686; 248/917
[58] Field of Search ........................... 248/151, 917–923; 312/223.1, 223.2; 364/708.1; 439/159; 174/135, 138 F; 361/681–686; 70/58

[56] References Cited

U.S. PATENT DOCUMENTS

| | | | |
|---|---|---|---|
| 5,030,128 | 7/1991 | Herron et al. | 364/708.1 X |
| 5,186,646 | 2/1993 | Pederson | 361/686 X |
| 5,384,686 | 1/1995 | Mesfin et al. | 361/686 |

*Primary Examiner*—Michael W. Phillips
*Attorney, Agent, or Firm*—Henry N. Garrana; Michelle M. Turner; Mark P. Kahler

[57] ABSTRACT

A portable computer desktop docking system includes a base structure, a port replicator, a shroud and a monitor stand. The base structure is horizontally supportable on a desktop and has an upwardly and rearwardly sloping top side with the port replicator being mounted on a rear section thereof. To dock the computer, it is manually slid rearwardly along the top side of the base structure until a rear side connector on the computer is forcibly mated with a front side connector on the port replicator. The port replicator has a rear side connectable to desktop peripheral device electrical cables. The shroud structure snaps onto a rear side of the base structure, conceals port replicator end portions of the cables, and groups the cables so that they exit the shroud structure in a horizontally central rear side portion thereof. The monitor stand has a monitor support platform from which four support legs depend. Bottom ends of the legs interlock with side edge projections on the base structure to position the platform above the port replicator and parallel with the desktop. A front pair of these side edge projections are positioned to permit the user's index fingers to rearwardly hook around them so that the user's thumbs can engage spaced apart front side portions of the computer and provide leverage for manually pushing the computer rearwardly along the top side of the support base structure to forcibly interconnect the port replicator and computer connector structures during docking.

20 Claims, 4 Drawing Sheets

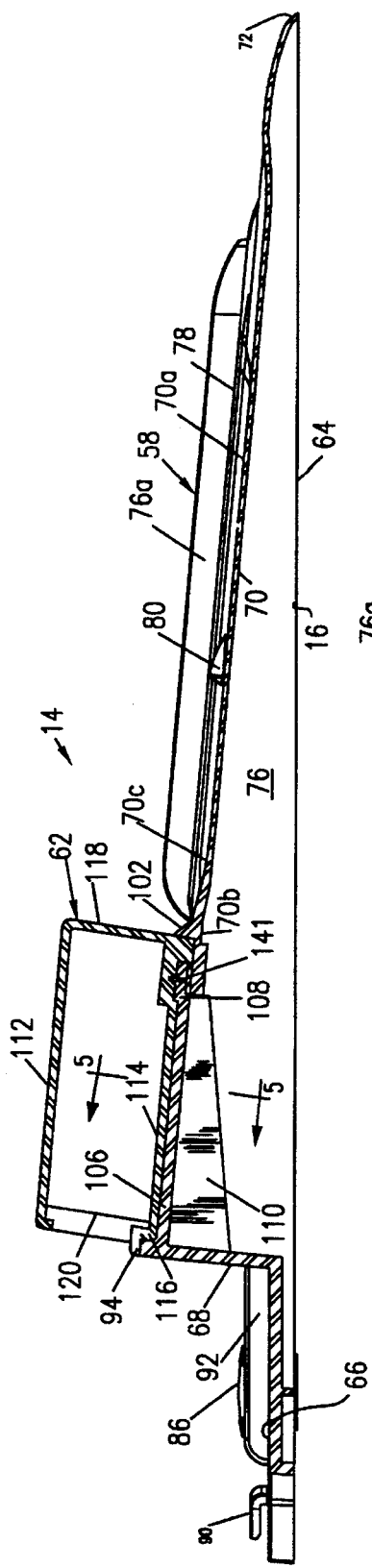
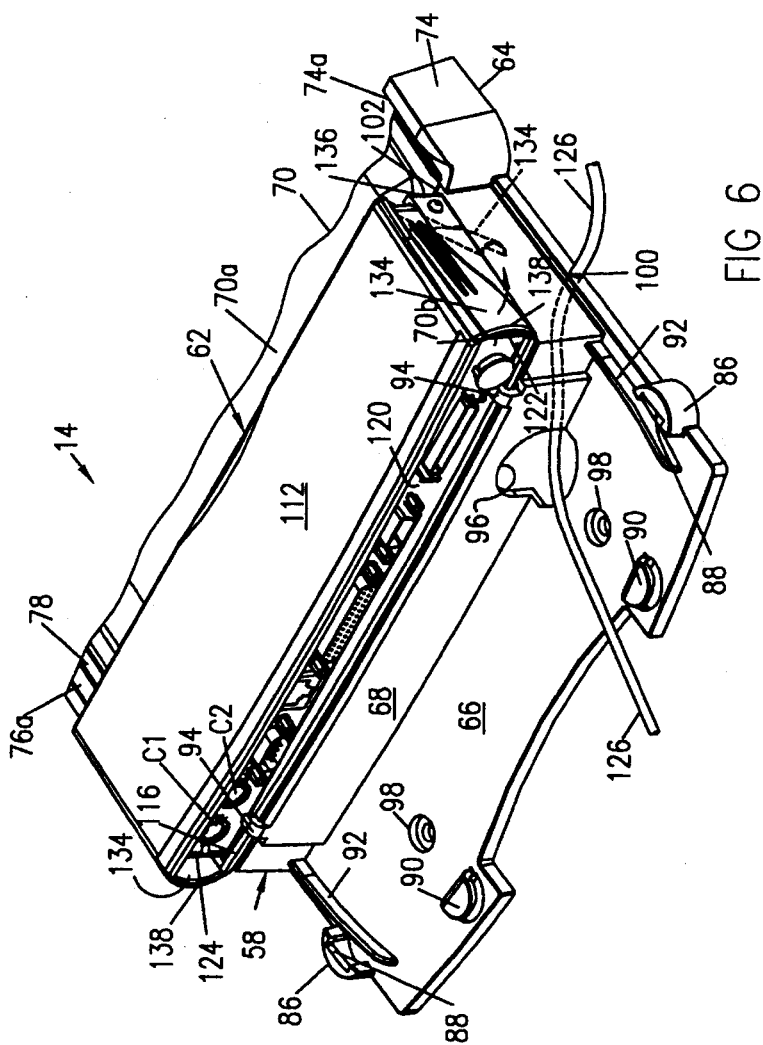
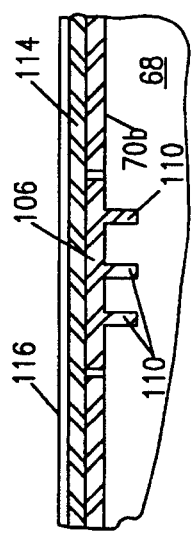
FIG 4
FIG 5
FIG 6

PORTABLE COMPUTER DESKTOP DOCKING SYSTEM

BACKGROUND OF THE INVENTION

The present invention generally relates to computer apparatus, and more particularly relates to docking apparatus used in conjunction with compact portable computers such as notebook computers.

To enable small portable computers, such as the increasingly popular notebook computer, to be utilized in conjunction with desktop computer peripheral devices such as a monitor and printer, a structure commonly referred to as a port replicator may be used. A pore replicator is basically a relatively small electronic device positionable on the desktop or other horizontal work surface and serving as an interface between the notebook computer and the desktop peripherals with which it is to be used.

As conventionally configured, a port replicator includes a housing adapted to rest on a desktop and having a rear side from which a series of interconnection cables extend to the selected peripheral equipment, and a front side having thereon a connector structure adapted to matingly engage a corresponding connector structure on the rear side of the notebook computer when the computer is placed on the desktop and pushed against the front side of the port replicator in a manner matingly engaging the computer and port replicator connector structures.

Upon this mating of such connector structures, the notebook computer is operatively connected to the peripheral equipment, and is said to be "docked" to the port replicator. When the desktop-based computing task is finished, the portable computer may be simply disconnected from the port replicator, thus disassociating the computer from the peripherals and readying it again for independent operation. While this docking and undocking procedure is a relatively simple undertaking, the conventional use and positioning of a port replicator on the typical desktop work space carries with it several well known problems, limitations and disadvantages.

For example, the typical conventional port replicator is small and relatively light weight, yet can have a series of connector cables extending outwardly from its rear side and then extending down the rear side of the desk before looping back up to the desktop and connecting into the various computer peripheral devices thereon. With the port replicator undocked from the portable computer the relatively high weight of the vertical sections of the cables can tend to undesirably shift the port replicator along the desktop and even pull it off the rear side edge of the desk causing the port replicator to fall to the floor and sustain damage from the fall.

Additionally, the connector cables extending outwardly from the rear side of the port replicator typically do so in a rather unsightly jumble. From an aesthetic standpoint, this is particularly undesirable in an "executive" office arrangement in which the rear side of the desk faces a visitor seated in the computer user's room and facing the rear side of the desk upon which the port replicator is operatively disposed.

One of the advantages of a notebook computer is that its operating footprint is quite small. This advantage, though, is substantially diminished when the notebook computer is docked to a desktop-disposed port replicator which is, in turn, cable-connected to various full-size computer peripherals such as a keyboard, mouse and monitor. Of these three peripheral devices the monitor takes up the most desktop space and, when a conventional port replicator is used, must be placed on the desktop behind or to one side of the docked port replicator/portable computer structure. Thus, in many instances, the desktop space occupied by the docked portable computer system is as large or larger than that of a typical desktop computer system.

Another problem typically associated with the use of port replicators used with portable computers in desktop applications is that the computer can be rather difficult to dock to and undock from the port replicator. One aspect of this problem relates to the proper alignment of the mating computer and replicator connector structures during the docking operation. These mating connector structures typically have very finely pitched pin and socket structures that must be rather precisely aligned to properly achieve computer docking. This typically requires that the user visually inspect the back of the mating computer and the replicator connector structures to begin proper alignment during docking. In addition, electro-mechanical solutions often must be provided between the mating computer and the replicator to insure connection between the two units without placing undue stress on the connector.

Another aspect of this docking/undocking problem is related to the relatively high manual docking and undocking forces that must be exerted on the computer and port replicator. The manual exertion of the requisite docking and undocking force is sometimes difficult due to the configurations of the computer and the replicator which do not lend themselves to the convenient grasping of the structures in a manner permitting the necessary docking and undocking forces to be manually exerted thereon.

A further disadvantage of conventionally configured port replicator-based portable computer docking systems is that the docked computer must typically be rested horizontally on the desktop surface to achieve and maintain proper docking connection between the computer and the port replicator. This conventional requirement requires that the portable computer keyboard be parallel to the horizontal desktop surface. As is well known, this horizontal orientation of a notebook computer keyboard does not lend itself to comfortable typing—particularly over extended periods of typing.

As can be seen from the foregoing, a need exists for an improved port replicator-based portable computer desktop docking system that eliminates or at least substantially reduces the above-mentioned problems, limitations and disadvantages commonly associated with conventional replicator systems of the type generally described above. It is accordingly an object of the present invention to provide such an improved docking system.

SUMMARY OF THE INVENTION

In carrying out principles of the present invention, in accordance with a preferred embodiment thereof, improved desktop docking apparatus is provided for use with a portable computer, such as a notebook computer, having a bottom side, opposite front and rear sides, opposite left and right sides, and a first docking connector structure carried on its rear side.

In an overall preferred embodiment thereof, the docking apparatus comprises a support base structure, a port replicator, and a monitor support structure. The support base structure has (1) a generally flat bottom side positionable on a horizontal support surface such as a desktop; (2) a top side portion having front and rear sections and a front end, the front section being operative to support the bottom computer side for sliding movement of the computer thereon rear side first toward the rear section of the top support base structure side portion; (3) opposite left and right side edge portions; and (4) a pair of vertical walls extending in front-to-rear directions along the left and right side edge portions and having side edge sections projecting upwardly beyond the top side portion and being operative to slidingly engage the left and right computer sides, in a manner maintaining a desired left-to-right horizontal alignment of the computer, as the computer is moved rear side first rearwardly along the top side portion of the support base structure.

The apparatus also includes a port replicator having a bottom side, and a front side having disposed thereon a second docking connector structure releasably mateable with the first docking connector structure on the portable computer. Attachment means are provided for releasably securing the port replicator on the rear section of the top base structure side portion with the front side of the port replicator facing forwardly and the second docking connector structure being positioned to be forcibly interconnected with the first docking connector structure in response to forcible movement of the computer rearwardly along the front section of the top side portion of the support base structure.

A monitor support structure includes a platform upon which a monitor structure may be rested, and support legs depending from an underside portion of the platform. Cooperating means are provided on the support legs and the support base structure for releasably interconnecting the support legs and the support base structure in a manner supporting the platform above the port replicator in a generally parallel relationship with the horizontal support surface.

A variety of other structural and operational features are preferably incorporated in the docking apparatus in the representative preferred embodiment thereof. Such features are summarized below.

Preferably, the front and rear sections of the top support base structure side portion are upwardly and rearwardly canted at a relatively small angle, representatively about five degrees, to desirably make the typing position of the docked computer, when it is used in a stand-alone mode, more comfortable.

The port replicator, when the portable computer is operatively docked thereto, provides an electrical interface between the docked computer and conventional desktop computer peripheral devices such as a keyboard, monitor and mouse, which are interconnected with areas on the rear side of the port replicator by a series of electrical cables. Cable covering shroud means are provided, are removably connectable to a rear side of the support base structure over the rear port replicator side, and are operative to conceal the port replicator end portions of the cables and centrally group the cables at their exit location from the shroud means.

The attachment means are preferably operative to permit the mounted port replicator to resiliently pivot upwardly and rearwardly in response to docking forces on the second connector structure in the event that there is a slight vertical misalignment between the first and second connector structures as the first connector structure rearwardly approaches the second connector structure. To permit visual inspection of certain printed information disposed on the bottom side of the port replicator, an inspection opening is formed through an appropriate portion of the rear section of the top side portion of the support base structure.

A vertical rear side wall portion of the support base structure has an opening formed therein through which a locking cable may be forwardly extended and run beneath the top side portion of the support base structure. A small undercut depression in a side edge portion of the support base structure permits the locking cable to exit the support base structure, and a lock on the front end of the cable may be connected to a complementary portion of the docked computer.

To provide a visual indication that the requisite rearward docking movement of the computer has been completed, a suitably positioned alignment depression is formed in the top side portion of the support base structure adjacent its front end. As the computer is being rearwardly moved toward its docked position the computer covers the depression. However, when docking is completed, the depression is uncovered and becomes visible adjacent the front side of the docked computer.

Projection means are formed on and extend outwardly from the opposite left and right side edge portions of the base structure adjacent the front end thereore. The projection means are graspable by fingers of a user's hands, with the portable computer resting on the front section of the top side portion of the support base structure and the first and second docking connector structures being adjacent one another, in a manner resisting rearward movement of the support base structure while the user's thumbs press rearwardly against spaced portions of the front side of the computer to forcibly mate the first and second docking connector structures. In a preferred overall embodiment of the docking apparatus the aforementioned cooperating means include releasably interlockable portions on the support leg means and the projection means.

Latch means are carried on opposite left and right ends of the port replicator for horizontal pivotal movement relative thereto. The latch means are operative to forcibly engage the docked computer and move it forwardly relative to the port replicator to thereby forcibly decouple the first and second docking connector structures.

To facilitate the manual rearward sliding docking movement of the portable computer along the support base structure, a pair of upwardly projecting, elongated support ribs are formed on the front section of the top side portion of the support base structure and are parallel to the upwardly projecting portions of the vertical side walls. As the computer is being docked, it slides along the top sides of the support ribs.

Additionally, a pair of arcuate retaining projections extend upwardly from the front section of the top side portion of the support base structure. Each of the projections is positioned forwardly adjacent the rear section of the top side portion of the support base structure and laterally inwardly adjacent one of the support ribs. As the computer is being rearwardly docked, bottom side projections on the computer ride upwardly over the arcuate retaining projections just before the computer is docked. When the computer is subsequently undocked, the retaining projections form forward abutments for the bottom computer side projections to releasably prevent the computer from simply sliding forwardly off the ramped top side portion of the support base structure.

BRIEF DESCRIPTION OF THE DRAWINGS

FIG. 4 is an enlarged scale cross-sectional view through the system base portion taken along line 4—4 of FIG. 3;

FIG. 5 is an enlarged scale cross-sectional view through the system base portion taken along line 5—5 of FIG. 4; and FIG. 6 is a forwardly directed perspective view of a rear end section of the system base portion, with a cable covering shroud member removed therefrom.

DETAILED DESCRIPTION

Figure 1:
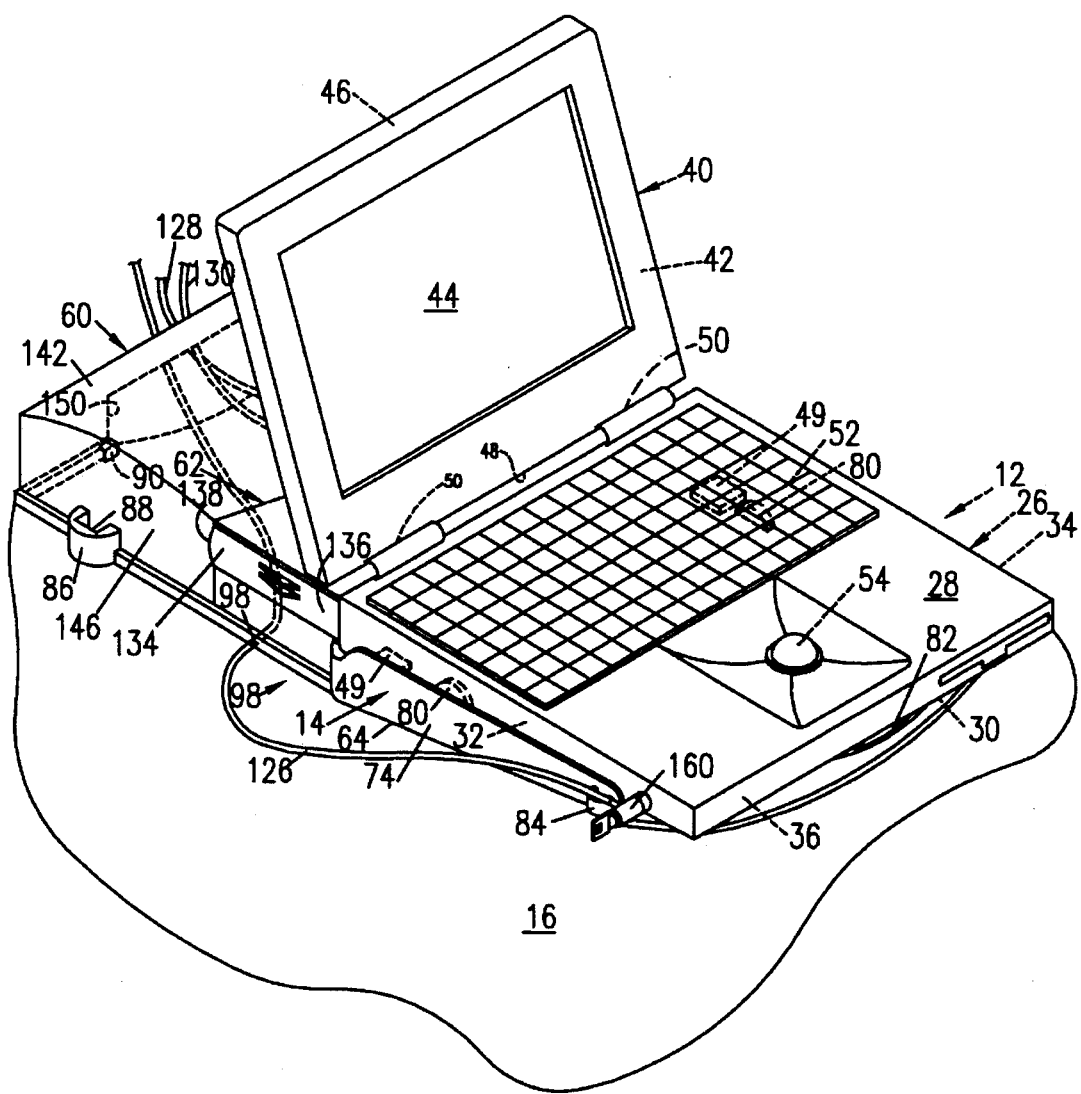
FIG. 1 is a front end perspective view of the base portion of a port replicator-based portable computer desktop docking system embodying principles of the present invention, with a representative portable computer illustrated in phantom and operatively docked to the port replicator in a first orientation permitting the use of the portable computer monitor and its built-in peripheral devices.
Figure 2B:
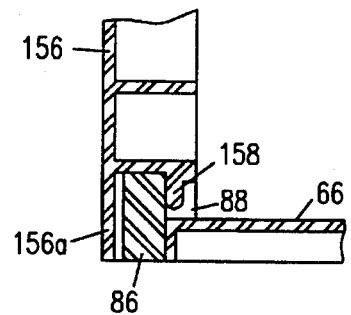
FIG. 2B is an enlarged scale cross-sectional view through the monitor stand and base portions of the system taken along line 2B—2B of FIG. 2A.
Figure 2A:
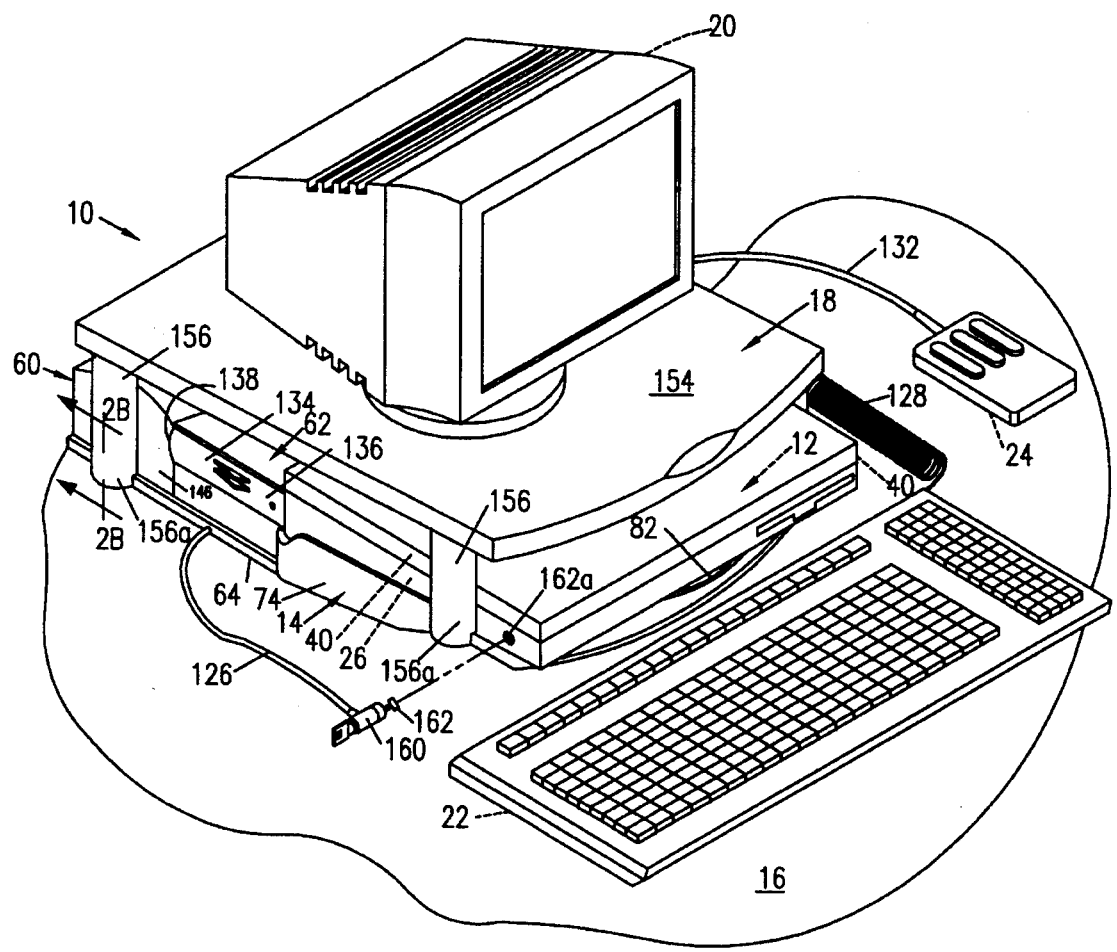
FIG. 2A is a reduced scale front end perspective view of the system with the portable computer shown in phantom in a second orientation permitting the use of the computer with the illustrated desktop peripheral devices, also shown in phantom, and also showing a monitor stand portion of docking system operatively attached to its base portion.
Figure 3:
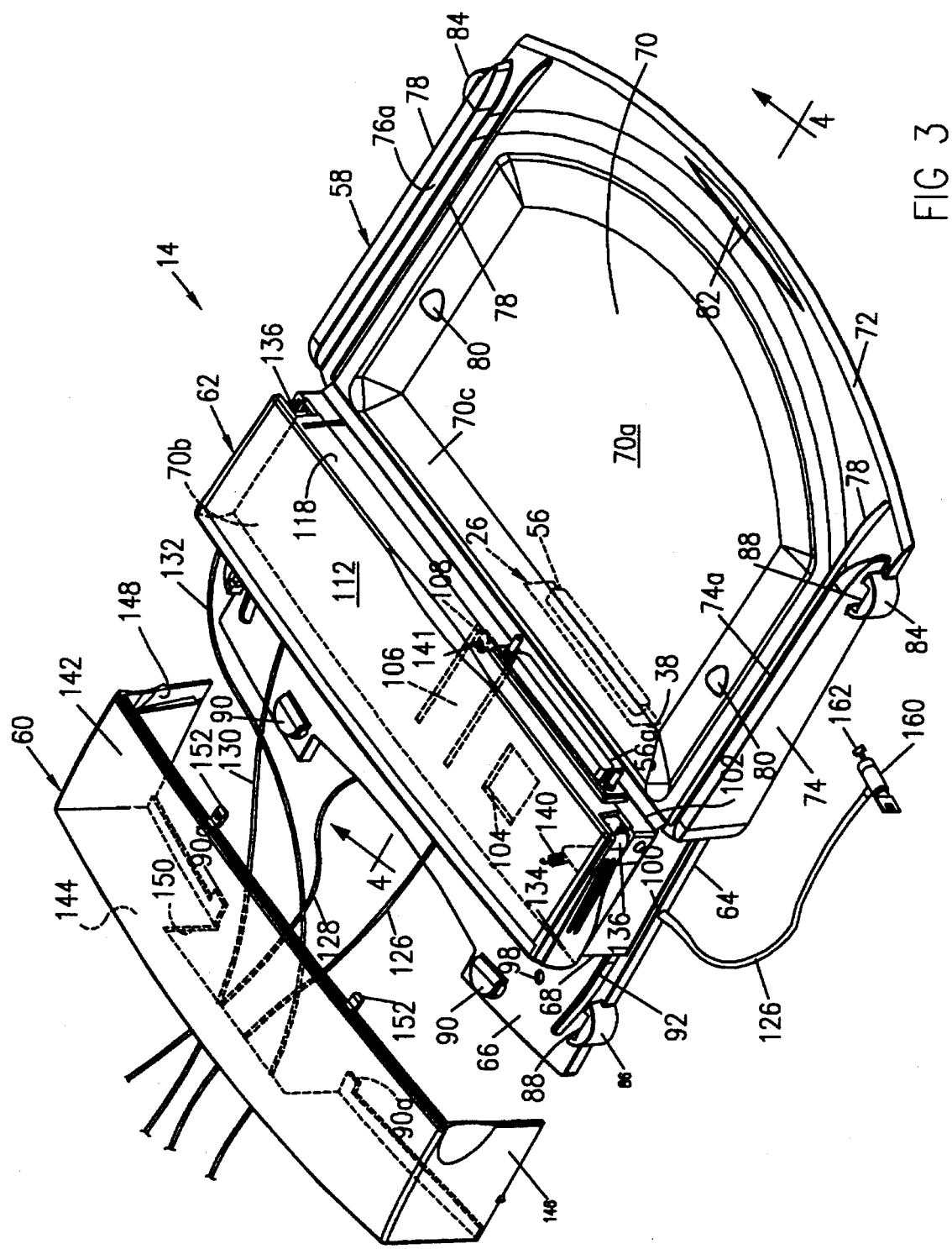
FIG. 3 is an enlarged scale, partially exploded front end perspective view of the base portion of the docking system with the portable computer removed therefrom.

Referring initially to FIGS. 1, 2A and 3, the present invention provides a specially designed port replicator-based portable computer desktop docking system 10 (see FIG. 2A) for use with a "dockable" portable computer, representatively a notebook computer 12 illustrated in phantom in FIGS. 1 and 2A. The system 10 includes a base portion 14 that may be rested atop a horizontal work surface such as the illustrated desktop 16, and a monitor stand portion 18 that is removably connectable to the base portion 14 in an overlying relationship therewith.

As will be subsequently described herein in greater detail, the system 10 permits the computer 12 to be docked to the base portion 14 (with the monitor stand 18 removed therefrom), opened, and used in a "stand-alone" fashion as shown in FIG. 1. Alternatively, the computer 12 may be closed and, with the monitor stand 18 in place on the base portion 14, used in conjunction with conventional desktop peripheral devices, such as the illustrated monitor 20, keyboard 22 and mouse 24, as illustrated in FIG. 2A.

The notebook computer 12 is of a conventional construction and includes a rectangular base housing 26 having top and bottom sides 28 and 30, opposite left and right sides 32 and 34, and opposite front and rear sides 36 and 38; and a rectangular lid housing 40 having an inner side 42 with a display screen 44 thereon, and opposite front and rear sides 46 and 48. For purposes later described, small rectangular stop projections 49 are formed on the bottom side 30 adjacent the opposite rear corners of the base housing 26. The rear side 48 of the lid housing 40 is pivoted to a top rear side edge portion of the base housing 26 by hinge structures 50, and a keyboard 52 and a representative trackball-type cursor positioning structure 54 are operatively mounted on the top side 28 of the base housing 26.

In a conventional manner the lid housing 40 is pivotal relative to the base housing 26 between an opened use orientation (FIG. 1) in which the lid housing 40 is generally vertically oriented and exposes the keyboard 52 and trackball 54, and a closed storage and transport orientation (FIG. 2A) in which the lid housing 40 extends across the base housing top side 28, covering the keyboard 52 and trackball 54, and is releasably latched to the base housing 28. For purposes later described, a docking connector structure 56 (shown in phantom in FIG. 3) is operatively mounted on the rear side 38 of the base housing 26.

With reference now to FIGS. 3–6, the base portion 14 of the docking system 10 comprises three components—a molded plastic support base 58, a molded plastic cable covering shroud member 60, and a port replicator 62. The support base 58 is of a generally hollow configuration and has a flat bottom side 64 adapted to rest upon the desktop 16; a horizontal rear bottom wall portion 66; a generally vertical rear end wall 68 extending upwardly from a front edge portion of the rear bottom wall portion 66; a top side wall 70 sloping forwardly and downwardly from a top edge portion of the rear end wall 68 at an angle of approximately five degrees and having an arcuate front end 72 generally level with the bottom side 64; and a pair of opposite left and right vertical side walls 74 and 76 having upper docking guide portions 74a and 76a.

As best shown in FIG. 4, the sloping top side wall 70 is divided into a ramped front portion 70a and a rear shelf portion 70b by a more sharply sloped intermediate portion 70c. Suitable reinforcing ribs (omitted from FIG. 4 for illustrative clarity) are integrally molded with the balance of the support base 58 and extend downwardly from the underside of the top side wall 70 to the bottom side 64 of the support base 58.

Various structural portions, having subsequently described functions, are molded integrally with the balance of the support base 58. As illustrated in FIGS. 3–6, these structural portions include a pair of support ribs 78 formed on the top side of the wall portion 70a inwardly adjacent the vertical wall portions 76a,78a and extending parallel thereto, a pair of arcuate retention projections 80 formed on the top side of the wall portion 70a inwardly adjacent rear end portions of the ribs 78, and an arcuate docking alignment depression 82 formed in the top side of the wall portion 70a adjacent its from end 72.

A pair of front support foot projections and leverage graps 84 are molded onto the outer sides of the vertical walls 74, adjacent their front ends, and a pair of rear support foot projections 86 are molded onto opposite left and right side edge portions of the bottom rear wall 66. Each of the foot projections 84,86 has a horizontally arcuate outer side configuration with a generally rectangular cutout area 88 formed on its inner side. Projecting upwardly from the top side of the bottom rear wall 66 are a spaced pair of rearwardly opening angled retention tabs 90 positioned adjacent the rear side edge of the wall 66, and a pair of guide ribs 92 that longitudinally extend in front-to-rear directions.

Near the top edge of the rear end wall 68 are a spaced pair of forwardly projecting angled retention tabs 94 that upwardly overlie a rear edge section of the rear shelf portion 70b of the top side wall 70. Below these tabs, and offset to the right as viewed in FIG. 6, is a locking cable opening 96 formed through the juncture of the rear support base walls 66 and 68. As illustrated in FIG. 6, the bottom rear wall 66 has a pair of circular openings 98 therein through which suitable fasteners may be downwardly extended and threaded into the desktop 16 to anchor the support base 58 thereto. For purposes later described, a bottom side edge portion of the wall 66 has an arcuate depression 100 formed therein.

With continuing reference to FIGS. 3–6, the rear shelf 70b has, along its front side edge, an upwardly projecting retaining lip portion 102. Additionally, the rear shelf 70b has a rectangular cutout area 104 positioned adjacent a resiliently deflectable tab section 106 having a free front end 108 and a plurality of stiffening ribs 110 formed on its bottom side.

The port replicator 62 has a rectangular housing with a top wall 112, a bottom wall 114 with a rear edge lip portion 116, front and rear side walls 118 and 120, and left and right end walls 122 and 124. A docking connector 56a is operatively mounted on the front side wall 118 (see FIG. 3) and is releasably mateable with the previously described docking connector 56 mounted on the rear side 38 of the computer base housing 26.

Mounted on the rear side wall 120 of the port replicator 62 (see FIG. 6) are a series of connector areas (such as the connector areas $C_1$ and $C_2$ shown in simplified form) to which various electrical cables may be connected. For example, as illustrated in FIG. 3, ends of a keyboard cable 128, a monitor cable 130 and a mouse cable 132 may be plugged into various ones of the connector areas C, with the other ends of the cables being respectively connected to the desktop keyboard 22, the monitor 20, and the mouse 24. Additionally, as illustrated in FIG. 6, a locking cable 126 is extended forwardly through the cable opening 96, extended beneath the support base 58, and extended outwardly through the arcuate side edge depression 100 in the support base 58.

A pair of ejector latches 134 are exteriorly mounted on the opposite end walls 122,124 of the port replicator 62, with each of the latches 134 having front and rear ends 136,138. The latches are mounted on the end walls 122,124 for horizontal pivotal movement relative thereto between the solid line operating positions shown in FIG. 6, in which the latches are parallel to the end walls 122,124, and a dotted line ejection position in which the rear ends 138 of the latches are pivoted outwardly away from the end walls 122,124 and the front ends of the latches are moved slightly forwardly of the front side wall 118 of the port replicator 62. Latches 134 are resiliently and pivotally biased toward their solid line operating positions by suitable spring members 140, only one of which is shown in FIG. 3.

The port replicator 62 is operatively mounted on the support base 58 by placing the port replicator 62 on the shelf wall portion 70b (see FIGS. 3, 4 and 6) in a manner such that the rear edge lip 116 of the port replicator is disposed beneath the angled retention tabs 94, and the front side wall 118 of the port replicator 62 is immediately behind the shelf lip 102. The free front end 108 of the vertically resilient shelf tab portion 106 is then secured to the bottom side 114 of the port replicator 62 using a screw 141 (see FIGS. 3 and 4) extended upwardly through an opening in the tab end 108 and threaded into the bottom side 114 of the port replicator housing.

As best illustrated in FIG. 3, the cable covering shroud member 60 has an open front side and bottom side, a top wall 142, a rear side wall 144, and opposite left and right end walls 146 and 148. A horizontally central cutout area 150 is formed in the rear side wall 144 and extends upwardly through its bottom side edge. At the horizontally opposite ends of the cutout area 150 a pair of tabs 90a project forwardly from the bottom side edge of the rear side wall 144, and a horizontally spaced pair of tabs 152 project forwardly from the front side edge of the top wall 142.

To removably attach the shroud member 60 to the rear side of the support base 58, the shroud member 60 is placed near the rear support base side as illustrated in FIG. 3 and portions of the various cables 126–132 adjacent the rear side of the support base are gathered together and extended through the rear side wall cutout area 150 of the shroud member 60. Shroud member 60 is removably snapped into place on the rear side of the support base 58 by simply moving the shroud member forwardly until its tabs 90a enter under the angled retention tabs 90 on the bottom rear wall 66 of the support base, and its tabs 152 overlie the port replicator rear edge lip 116, thereby bringing the shroud member 60 to its FIG. 1 installed position. During movement of the shroud member 60 toward the rear side of the support base 58, the opposite end walls 146,148 of the shroud member 60 slide between each adjacent guide rib and support foot projection pair 92,86 to maintain proper side-to-side alignment of the shroud relative to the support base.

As can be seen in FIG. 1, this hides the cable connection areas at the back side of the base portion 14 and additionally groups the installed cables in a neater central exiting arrangement on the docking system 10. Accordingly, when the system 10 is viewed from its rear side (by, for example, a visitor sitting at the rear side of the desktop 16), its appearance is made more aesthetically pleasing by the cable covering shroud member 60.

Turning now to FIGS. 2A and 2B, the monitor stand 18 includes a generally rectangular platform 154. Four support legs 156 depend from the corners of the platform 154 and have arcuate cross-sections along their lengths and lower end portions 156a configured to complementarily extend around the front and rear support foot projections 84,86 (see FIGS. 2B and 3) with the lower end portions 156a downwardly bearing on the desktop 16. As illustrated in FIG. 2B, each of the lower support leg end portions 156a has a downwardly projecting internal tab 158 that is received in the rectangular cutout area 88 of one of the support foot projections 84,86 to thereby prevent appreciable movement of the docking system base portion 14 relative to the monitor stand 18.

As previously mentioned, the portable computer 12 may be used in conjunction with the docking system 10 in both a stand-alone mode (FIG. 1) and in conjunction with representative desktop peripheral devices (FIG. 2) including the monitor 20, the keyboard 22 and the mouse 24. Referring now to FIGS. 1 and 3, to use the computer 12 in its stand-alone mode (FIG. 1) the monitor stand 18 is removed from the base portion 14, and, with its lid housing 40 of the portable computer 12 in its closed position, a rear portion of the portable computer 12 is first placed on a front portion of the ramped support base wall 70a, with opposite bottom side edge portions of the base housing 26 resting on the top sides of the support ribs 78.

Next, the computer 12 is manually pushed rearwardly toward the port replicator 62, with the vertical side wall portions 74a,76a slidingly engaging and horizontally aligning the computer relative to the base portion 14. As the back side of the computer 12 approaches the front side of the port replicator 62, the stop projections 49 on the bottom side of the computer base housing 26 ride up and over the arcuate retention projections 80 and then drop back down to their positions indicated in FIG. 1 in which the projections 49 are positioned between the front side of the port replicator and the retention projections 80. At this point the docking connector 56 on the back of the computer base housing 26 is closely adjacent and generally aligned with the corresponding connector 56a on the front side of the pore replicator 62.

To forcibly mate the two connectors 56,56a and thereby operatively interconnect the computer 12 with the port replicator 12, the user simply loops the his index fingers rearwardly around the front support foot projections 84, places his thumbs on opposite corner portions of the base housing front side 36, and then, using the projections 84 as manual force leveraging point, pushes with his thumbs to rearwardly drive the computer connector 56 into mating engagement with the corresponding connector 56a (see FIG. 3) on the port replicator 62. After this docking of the portable computer 12 is completed, the lid housing 40 may be opened as indicated in FIG. 1 and the computer turned on to ready it for independent use.

A visual indication that the computer 12 is properly docked to the port replicator 62 is conveniently provided by the docking alignment depression 82 (see FIG. 1). Depression 82 is uncovered by the rearwardly moving base housing 26, and revealed adjacent its front side 36, when the computer connector 56 is fully mated with the port replicator connector 56a.

As previously mentioned, the upper side portions 74a,76a of the vertical support base walls 74,76 slidingly engage and horizontally align the computer 12 as it approaches the port replicator connector 56a during the docking process. Moreover, the use of the support ribs 78 that slidingly engage the underside of the computer base housing 26 during docking movement thereof serves to reduce the manual effort required to move the computer rearwardly and upwardly toward its docked orientation indicated in FIG. 1.

As the rearwardly moving computer 12 approaches the port replicator connector 56a, a slight vertical misaliginent between the connectors 56,56a (for example, if the connector 56 is slightly higher than the connector 56a) is automatically compensated for by the shelf tab 106 which resiliently permits upward deflection of the connector 56a to compensate for this small vertical misalignment between the connectors 56,56a. Another convenient feature built into the docking system 10 is the shelf wall cutout area 104 (see FIG. 3) which permits a visual inspection (from the bottom side of the base portion 14) of important identifying information imprinted on the bottom side of the port replicator 62.

In addition to the front support foot portions 84 which conveniently provide manual docking leverage, the upward and rearward canting of the top support base wall portion 70a automatically tilts the computer base housing 26 to an inclined typing position which is considerably more comfortable than the horizontal position conventionally used when the computer is simply placed flat on the desktop 16. With the shroud member 60 snapped into place as described above, the various cables are covered at their junctures with the port replicator 62 and grouped into a relatively neat central bundle that exits the rear side of the docking system 10.

The locking cable 126 is provided at its outer end with a conventional key-operated cylindrical lock 160 having, at one of its ends, a rotatable locking member 162 see FIG. 2A) that may be operatively inserted into a corresponding opening 162a no anchor the lock 160 to the computer 12. The opposite end of the cable 126 is suitably anchored to the desk, thereby substantially hindering removal of both the support base 58 and the computer 12 from the desk.

To remove the docked computer 12 from the docking system base portion 14, the lid housing 40 is closed, lock 160 is removed from the computer base housing 26, and the pore replicator latches 134 (see FIG. 6) are manually pivoted from their solid line operating positions to their outwardly pivoted dotted line positions. This forces the previously described latch member front end portions 136 forwardly against rear corner portions of the computer base housing 26 to thereby disconnect the computer connector 56 from the associated port replicator connector 56a and undock the computer 12 from the docking system base portion 14.

Further forward sliding movement of the undocked computer 12 off the ramped support base wall 70a is conveniently blocked by the retention projections 80 that serve as stops for the bottom side projections 49 on the underside of the computer base housing 26. To complete the removal of the portable computer 12 from the base portion 14, the rear side of the computer is simply lifted up, so that the projections 49 upwardly clear the projections 80, and the undocked computer 12 is pulled out of the base portion 14.

Turning now to FIG. 2A, if the user desires to used the docked portable computer 12 with the desktop peripheral devices 20,22 and 24, the user simply closes the lid housing 40, installs the monitor stand 18 on the system base portion 14 by engaging the lower ends 156a of the support legs 156 with the front and rear support foot projections 84,86 as previously described in conjunction with FIG. 2B, and placing the monitor 18 on the monitor stand platform 154 as indicated in FIG. 2A. In this manner, the desktop space previously needed for the monitor 20 is eliminated, and undesirable shifting of the base portion 14 along the desktop 16 is essentially prevented by the weight of the monitor 20 which holds the lower ends 156a of the support legs 156 against the desktop 16, thereby effectively anchoring the base portion 14 relative to the desktop 16 via the support foot projections 84 and 86.

Even with the monitor stand 18 installed on the base portion 14, and the monitor resting on the platform 154 as shown in FIG. 2A, the portable computer 12 can be docked to and undocked from the port replicator 62 in generally the convenient manner previously described for the base portion 14 without the monitor stand 18 operatively mounted thereon. During docking of the computer 12, the same manual leveraging technique is used to forcibly mate the connectors 56,56a once the computer connector 56 has been brought into adjacency with the port replicator connector 56a. However, instead of the user hooking his index fingers rearwardly around the front support foot projections 84 he hooks them around the lower end portions 156a of the front pair of support legs 156 and then pushes the computer 12 rearwardly with his thumbs. As indicated in FIG. 2A, the latches 134 are accessible through the pairs of support legs 156 on each side of the monitor stand 18. Accordingly, the latches 134 may be conveniently used to forcibly decouple the connectors 56,56a as previously described above when the monitor stand 18 was not used.

The foregoing detailed description is to be clearly understood as being given by way of illustration and example only, the spirit and scope of the present invention being limited solely by the appended claims.

What is claimed is:

1. Docking apparatus for use with a portable computer having a bottom side, opposite front and rear sides, opposite left and right sides, and a first docking connector structure carried on said rear side, said docking apparatus comprising:

a support base structure having:
  a generally flat bottom side positionable on a horizontal support surface such as a desktop,
  a top side portion having front and rear sections and a front end, said front section being operative to support the bottom computer side for sliding movement of the computer thereon rear side first toward said rear section of said top side portion, opposite left and right side edge portions, a pair of vertical walls extending in front-to-rear directions along said left and right side edge portions and having side edge sections projecting upwardly beyond said top side portion and being operative to slidingly engage the left and right computer sides, in a manner maintaining a desired left-to-right horizontal alignment of the computer, as the computer is moved rear side first rearwardly along said top side portion;

a port replicator having a bottom side, and a front side having disposed thereon a second docking connector structure releasably mateable with said first docking connector structure on the portable computer;

attachment means for releasably securing said port replicator on said rear section of said top side portion of said base structure with said front side of said port replicator facing forwardly and said second docking connector structure being positioned to be forcibly interconnected with the first docking connector structure in response to forcible movement of the computer rearwardly along said front section of said top side portion of said support base structure;

a monitor support structure including a platform upon which a monitor may be rested, and support legs depending from an underside portion of said platform; and cooperating means on said support legs and said support base structure for releasably interconnecting said support legs and said support base structure in a manner supporting said platform above said port replicator in a generally parallel relationship with the horizontal support surface.

2. The docking apparatus of claim 1 wherein:

said front and rear sections of said top side portion of said support base structure are upwardly and rearwardly canted at a relatively small angle.

3. The docking apparatus of claim 2 wherein:

said relatively small angle is about five degrees.

4. The docking apparatus of claim 2 wherein:

said port replicator has a rear side with a plurality of connector areas to which first end portions of a plurality of electrical cables, connectable at second end portions thereof to computer peripheral devices, may be connected, said support base structure has a generally vertical rear side wall disposed below and generally aligned with said rear side of said port replicator, and said docking apparatus further comprises cable covering shroud means, removably connectable to said support base structure over said rear port replicator side and said vertical rear side wall, for concealing said rear side of said port replicator and the first end portions of the plurality of electrical cables, said shroud means having a rear side wall with a generally central opening formed therein and through which the plurality of electrical cables may outwardly pass.

5. The docking apparatus of claim 4 further comprising:

cooperating means on said shroud means and said support base structure for permitting said shroud means to be removably connected to said support base structure by pushing said shroud means forwardly into engagement with a rear portion of said support base structure.

6. The docking apparatus of claim 1 wherein:

said attachment means are operative to permit said port replicator to resiliently pivot in an upward and rearward direction relative to said rear section of said top side portion of said support base structure in response to an upward force exerted on said second docking connector structure by said first docking connector structure in response to vertical misalignment therebetween during forcible docking of the computer.

7. The docking apparatus of claim 6 wherein said attachment means include:

a tab formed integrally with said rear section of said top side portion of said support base structure, said tab being resiliently deflectable relative to the balance of said rear section of said top side portion of said support base structure, and having a front end portion, and means for securing said bottom side of said port replicator to said front end portion of said tab.

8. The docking apparatus of claim 1 further comprising:

an inspection opening formed in said rear section of said top side portion of said support base structure and through which a predetermined area of said bottom side of said port replicator may be viewed from said bottom side of said support base structure.

9. The docking apparatus of claim 1 wherein:

said support base structure has a generally vertical rear side wall disposed below and generally aligned with said rear side of said port replicator, and said docking apparatus further comprises an opening formed in said rear side wall and through which a locking cable may be forwardly extended to beneath said rear section of said top side portion of said support base structure, and a depression formed in one of said opposite left and right side edge portions, forwardly of said rear side wall, and through which the locking cable may be outwardly extended to the exterior of said support base structure.

10. The docking apparatus of claim 1 further comprising:

means, disposed on a front end portion of said front section of said top side portion of said top side portion of said support base structure, for providing a visual indication that the computer has been fully docked to said port replicator.

11. The docking apparatus of claim 10 wherein said means for providing a visual indication include:

a depression formed in said front end portion of said front section of said top side portion of said support base structure and positioned thereon in a manner that said depression is covered by the commuter as the computer is moved rearwardly along said front section toward the docked position of the computer, and is uncovered and becomes visible when the computer reaches its docked position.

12. The docking apparatus of claim 1 further comprising:

projection means formed on and extending outwardly from said opposite left and right side edge portions of said base structure adjacent said front end thereof and being graspable by fingers of a user's hands, with the portable computer resting on said front section of said top side portion of said support base structure and said first and second docking connector structures being adjacent one another, in a manner resisting rearward movement of said support base structure while the user's thumbs press rearwardly against spaced portions of the front side of the computer to forcibly mate said first and second docking connector structures.

13. The docking apparatus of claim 12 wherein said cooperating means include releasably interlockable portions on said leg means and said projection means.

14. The docking apparatus of claim 1 further comprising:
   latch means carried on said port replicator for pivotal movement relative thereto and being operative to forcibly engage the docked computer and move it forwardly relative to said port replicator to thereby forcibly decouple said first and second docking connector structures.

15. The docking apparatus of claim 1 further comprising:
   a pair of upwardly projecting, elongated support ribs formed on said front section of said top side portion of said support base structure, said support ribs longitudinally extending parallel to said side edge sections of said vertical walls, being inwardly adjacent thereto, and being adapted to slidably support opposite bottom side portions of the computer.

16. The docking apparatus of claim 15 further comprising:
   a pair of arcuate retaining projections extending upwardly from said front section of said top side portion of said support base structure, each of said pair of retaining projections being positioned forwardly adjacent said rear section of said top side portion of said support base structure and laterally inwardly adjacent a different one of said support ribs.

17. Docking apparatus for use with a portable computer having a bottom side, opposite front and rear sides, opposite left and right sides, and a first docking connector structure carried on said rear side, said docking apparatus comprising:
   a support base structure having:
      a generally flat bottom side positionable on a horizontal support surface such as a desktop,
      a top side portion having front and rear sections and a front end, said front section being operative to support the bottom computer side for sliding movement of the computer thereon rear side first toward said rear section of said top side portion, said front and rear sections being upwardly and rearwardly canted at a relatively small angle,
      opposite left and right side edge portions,
      a pair of vertical walls extending in front-to-rear directions along said left and right side edge portions and having side edge sections projecting upwardly beyond said top side portion and being operative to slidingly engage the left and right computer sides, in a manner maintaining a desired left-to-right horizontal alignment of the computer, as the computer is moved rear side first rearwardly along said top side portion, and
      a generally vertical rear side wall positioned generally at a rear side portion of said rear section of said top side portion of said support base structure;
   attachment means for releasably securing a port replicator on said rear section of said top side portion of said base structure with a front side of the port replicator, having a second docking connector structure thereon, facing forwardly with the second docking connector structure being positioned to be forcibly interconnected with the first docking connector structure in response to forcible movement of the computer rearwardly along said front section of said top side portion of said base structure, the port replicator further having a rear side with a plurality of connector areas to which first end portions of a plurality of electrical cables, connectable at second end portions thereof to computer peripheral devices, may be connected;
   cable covering shroud means, removably connectable to said support base structure over the rear port replicator side and said vertical rear side wall, for concealing the rear side of the port replicator and the first end portions of the plurality of electrical cables, said shroud means having a rear side wall with a generally central opening formed therein and through which the plurality of electrical cables may outwardly pass; and
   projection means formed on and extending outwardly from said opposite left and right side edge portions of said base structure adjacent said front end thereof and being graspable by fingers of a user's hands, with the portable computer resting on said front section of said top side portion of said base structure and said first and second docking connector structures being adjacent one another, in a manner resisting rearward movement of said support base structure while the user's thumbs press rearwardly against spaced portions of the front side of the computer to forcibly mate said first and second docking connector structures.

18. The docking apparatus of claim 17 further comprising:
   a port replicator operatively mounted on said rear section of said top side portion of said support base structure by said attachment means.

19. The docking apparatus of claim 17 further comprising:
   a monitor support structure including a platform upon which a monitor may be rested, and support legs depending from an underside portion of said platform, and
   cooperating means on said support legs and said support base structure for releasably interconnecting said support legs and said support base in a manner supporting said platform above said support base structure in a generally parallel relationship with the horizontal support surface.

20. The docking apparatus of claim 19 wherein said cooperating means include releasably interlockable portions on said leg means and said projection means.

* * * * *